United States Patent [19]

Kleiner et al.

[11] 4,238,575
[45] Dec. 9, 1980

[54] STABILIZED COMPOSITIONS CONTAINING POLYMERIC THIOSYNERGISTS

[75] Inventors: Eduard K. Kleiner, New York; Martin Dexter, Briarcliff Manor, both of N.Y.

[73] Assignee: Ciba-Geigy Corporation, Ardsley, N.Y.

[21] Appl. No.: 11,275

[22] Filed: Feb. 12, 1979

Related U.S. Application Data

[63] Continuation of Ser. No. 902,454, May 3, 1978, abandoned, which is a continuation of Ser. No. 697,094, Jun. 17, 1976, abandoned.

[51] Int. Cl.$^3$ .................... C08L 33/14; C08L 23/00
[52] U.S. Cl. ........................... 525/212; 260/45.7 S; 260/45.85 S
[58] Field of Search ................ 44/76, 80, 62; 260/45.7 S, 45.85 R, 45.85 E, 45.85 S; 525/212

[56] References Cited

U.S. PATENT DOCUMENTS

| | | | |
|---|---|---|---|
| 2,956,982 | 10/1960 | McCall et al. | 260/45.85 R |
| 3,268,494 | 8/1966 | Herbert et al. | 44/62 X |
| 3,269,808 | 8/1966 | Churchill et al. | 44/62 |
| 3,285,855 | 11/1966 | Dexter et al. | 252/57 |
| 3,345,327 | 10/1967 | Dexter et al. | 260/45.85 S |
| 3,758,549 | 9/1973 | Dexter et al. | 260/45.85 S |

OTHER PUBLICATIONS

Nakatsuka et al., *Chemical Abstracts*, vol. 72:67,744a (1970).
Berlin et al., *Vysokomol Soedin*, A14: No. 4, pp. 860–865 (1972).

*Primary Examiner*—Lorenzo B. Hayes
*Assistant Examiner*—Amelia B. Yarbrough
*Attorney, Agent, or Firm*—Luther A. R. Hall

[57] ABSTRACT

Polymeric thiosynergists, such as poly[2-(alkylthio)ethyl methacrylate], are stabilizers for organic materials subject to oxidative, thermal and/or light induced deterioration. These polymeric synergists are made by normal free radical polymerization of the corresponding (alkylthio)alkyl polymerizable esters. The esters are prepared by conventional esterification procedures. These compounds are used in conjunction with phenolic antioxidants to stabilize organic materials, particularly polyolefins and hydrocarbon compositions, against the deleterious effects of heat and oxygen.

6 Claims, No Drawings

STABILIZED COMPOSITIONS CONTAINING POLYMERIC THIOSYNERGISTS

This is a continuation of application Ser. No. 902,454, filed on May 3, 1978, now abandoned, which in turn is a continuation of Ser. No. 697,094, filed on June 17, 1976, now abandoned.

BACKGROUND OF THE INVENTION

The present invention pertains to polymeric thiosynergists, such as poly[2-(ethylthio)ethyl methacrylate], and to compositions which are stabilized by these materials against the deleterious effects of heat and oxygen.

Of particular interest are polyolefin resin compositions containing said derivatives which are stabilized against thermal aging and light induced degradation. Polyolefin resins have inherently good mechanical and physical properties and are useful as resin substrates for molded articles, films and fibers. Other resins of particular interest include thermoplastic elastomers, ABS resins, polystyrene, and other hydrocarbon polymers.

In an attempt to permit these resins to exhibit the full measure of their inherent properties, it has been customary to add one or more stabilizers to the resins to overcome their susceptibility to oxidative and thermal degradation.

Phenolic antioxidants have long been used in the art as such stabilizers with varying degrees of success as seen in U.S. Pat. No. 3,285,855. It was shown in U.S. Pat. No. 2,956,982 that the dialkyl esters of $\beta$-thiodipropionic acid were also effective stabilizers for polyolefin resins. The combination of a lesser amount of a phenolic antioxidant with a small quantity of a dialkyl $\beta$-thiodipropionate was found to have a synergistic effect on the level of stabilization of such compositions superior to the use of either the phenolic antioxidant alone or the dialkyl $\beta$-thiodipropionate alone at the given concentration, (U.S. Pat. No. 3,285,855).

Other sulfur containing compounds have been discovered which also exhibit synergistic stabilization effects in combination with phenolic antioxidants in polyolefin compositions. These include the dialkyl alkylthiosuccinates (U.S. Pat. No. 3,345,327); the thiodialkanoate polyesters (U.S. Pat. Nos. 3,157,517 and 3,378,516); the derivatives of N',N'',N'''-tris(3-mercaptopropionyl)hexahydros-triazine (U.S. Pat. No. 3,538,092); the pentaerythritol or trimethylolpropane esters of alkylthioalkanoic acids (U.S. Pat. Nos. 3,629,194 and 3,758,549); the 2,4,6-tris-(alkylthioalkylthio)-1,3,5-triazines (U.S. Pat. No. 3,652,561); and the tris(2-alkylthioalkanoylethyl) isocyanurates (Japanese Kokai 75/106,881).

While all of these materials exhibit useful synergistic stabilization effects in the presence of phenolic antioxidants in polyolefin or other hydrocarbon systems which are subject to oxidative and/or thermal deterioration, the dialkyl $\beta$-thiodipropionates (particularly the dilauryl and especially the distearyl esters) have become the thiosynergists of choice in the art enjoying widespread use.

Alkylthioalkyl acrylate, methacrylate and crotonate monomers are widely known. These polymerizable monomers have been used with a variety of other vinyl monomers to prepare copolymers having a plethora of uses such as in flocculents (U.S. Pat. No. 3,280,081), property improvement additives for paper (U.S. Pat. Nos. 3,207,656; 3,332,835), flame resistant acrylic sheet (U.S. Pat. No. 3,634,554), acrylic elastomers (German Offen No. 2,025,342) and viscosity index improvers for oils (U.S. Pat. Nos. 3,278,500; 3,354,087).

Copolymers of methyl methacrylate with 0.1 to 10% $\beta$-(ethylthio)ethyl methacrylate were found to be more resistant to thermal oxidative degradation than either homopolymer of the above monomers. (USSR 300,482; A. A. Berlin et al, *Vysokomol Soedin*, *A*14(4), 860 (1972).

The homopolymers of alkylthioalkyl methacrylates are also known. Poly[$\beta$-(ethylthio)ethyl methacrylate] was described by Berlin supra and its synthesis and polymerization characteristics by S. Hashimoto et al, *Kobunshi Kagaku*, 27(298) 110 (1970); *Chem. Abst.*, 73, 4225 g (1970).

Poly[$\beta$-(ethylthio)ethyl methacrylate] has been used as a catalyst in preparing $\beta$-hydroxyalkyl esters useful in coatings (South Africa Pat. No. 68 01,333) and has been reacted to form a polymeric structure with pendant sulfonium groups useful in adhesives, coatings and finishes (U.S. Pat. No. 3,310,540).

Poly[$\beta$-(dodecylthio)ethyl methacrylate] was found useful as a viscosity index improver and antisludge additive in turbine fluids (U.S. Pat. No. 3,269,808).

The use of poly(alkylthioalkyl methacrylates, acrylates and crotonates) as polymeric thiosynergists in polymer compositions stabilized against oxidative, thermal and/or light induced deterioration is not disclosed or suggested in the prior art.

Polymeric stabilizers consisting of acrylic or methacrylic acid copolymers with styrene, ethylene or methyl methacrylate esterified with the glycidol esters of alkylthiopropionic acid are disclosed in Japan 69 32,056. These structures are only remotely related to the instant homopolymers.

DETAILS OF THE DISCLOSURE

The present invention pertains to stabilized compositions of organic materials, particularly polyolefins and hydrocarbon structures, normally subject to oxidative, thermal and/or light induced deterioration which contain effective amounts of a phenolic antioxidant and a polymeric thiosynergist.

More particularly, this invention relates to a stabilized composition which comprises (a) an organic material normally subject to oxidative, thermal or light induced deterioration, (b) 0.005 to 5% by weight of the organic material (a) of a phenolic antioxidant, and (c) 0.005 to 5% by weight of the organic material (a) of a polymeric thiosynergist with the unit structural formula I

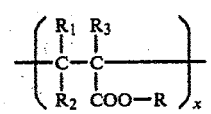

wherein
$R_1$ is hydrogen, methyl, phenyl or —COOR,
$R_2$ is hydrogen or —COOR,
$R_3$ is hydrogen, methyl, —COOR or —CH$_2$COOR,
with the proviso that at least two of $R_1$, $R_2$ and $R_3$ must be hydrogen at the same time or with the proviso that when $R_1$ is —COOR, $R_2$ is hydrogen and $R_3$ is hydrogen, methyl or —CH$_2$COOR,
R is -C$_n$H$_{2n}$S-R$_4$,
n is 2 to 6, R₄ is alkyl of 1 to 18 carbon atoms, and
x is an integer from 4 to 90.

Illustrative of the groups embraced by this invention are the following:

$R_1$ is hydrogen, methyl, phenyl or -COOR, but preferably is hydrogen.

$R_2$ is hydrogen or -COOR, but preferably is hydrogen.

$R_3$ is hydrogen, methyl, -COOR or -CH₂COOR, but preferably is methyl.

R is -$C_nH_{2n}SR_4$ where n is 2 to 6. Preferably n is 2 with -$C_nH_{2n}$- being ethylene.

$R_4$ is alkyl of 1 to 18 carbon atoms, but preferably is alkyl of 2 to 12 carbon atoms. Most preferably $R_4$ is alkyl of 2 to 8 carbon atoms with $R_4$ as ethyl being particularly preferred.

The value of x depends on the degree of polymerization with higher molecular products being preferred. x is an integer from 4 to 90, but preferably x is from 25 to 90. The higher molecular weight products better resist extraction from the stabilized compositions.

The polymeric thiosynergists of this invention may also be copolymers having the formula

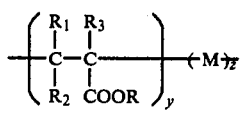

where R, $R_1$, $R_2$ and $R_3$ are as defined previously. y and z represent the number of monomer moieties in the copolymer chain which can vary from as low as 4 to over 100.

M represents the wide variety of ethylenically unsaturated comonomers which can be copolymerized with α,β-unsaturated ester monomers of formula II. The comonomers useful in the preparation of the copolymers of this invention include the alkyl acrylates and alkyl methacrylates with an alkyl of 1 to 18 carbon atoms, vinyl chloride, vinylidene chloride, vinyl fluoride, vinylidene fluoride, acrylonitrile, methacrylonitrile, styrene, α-methylstyrene, dienes such as 1,3-butadiene, chloroprene, and isoprene, nitrogen-vinyl monomers such as vinyl pyridine, N-vinyl pyrrolidone, 2-methyl-5-vinylpyridine, vinyl esters such as vinyl acetate, vinyl isobutyrate, vinyl oleate, vinyl benzoate and the like, and alkyl vinyl ethers such as methyl vinyl ether, isoamyl vinyl ether, n-octadecyl vinyl ether and the like.

The monomers of formula II fall into two general types. The first type includes the acrylates and methacrylates which polymerize readily to form homopolymers or copolymers with the monomers represented by M above. The second type is exemplified by the fumarates, maleates, mesaconates, citraconates and itaconates. These latter monomers show a lower tendency toward homopolymerization and form generally low molecular weight homopolymers or oligomers. On the other hand, they do form alternating copolymers with many of the comonomers listed above to give high molecular weight polymers in good yield and at acceptable polymerization rates.

The use of a comonomer such as a long chain alkyl or methacrylate to form a copolymeric thiosynergist can improve the compatibility of said thiosynergists in the polymer compositions of this invention wherein the polymer is a hydrocarbon such as polyethylene or polypropylene. Additionally, judicious choice of a comonomer can lead to polymeric thiosynergists which can have physical properties ranging from an oil to a particulate solid.

Methods of Preparation

The polymeric thiosynergists of this invention are prepared from α,β-unsaturated ester monomers as represented by the following formula II:

wherein $R_1$, $R_2$, $R_3$ and R are as defined above.

Examples of such esters are:

| Esters of | $R_1$ | $R_2$ | $R_3$ |
|---|---|---|---|
| Acrylic acid | —H | —H | —H |
| Methacrylic acid | —H | —H | —CH₃ |
| Crotonic acid | —CH₃ | —H | —H |
| Cinnamic acid | —C₆H₅ | —H | —H |
| Fumaric acid | —COOR | —H | —H |
| Maleic acid | —H | —COOR | —H |
| Mesaconic acid | —COOR | —H | —CH₃ |
| Citraconic acid | —H | —COOR | —CH₃ |
| Itaconic acid | — | —H | —CH₂COOR |
| Aconitic acid | —COOR | —H | —CH₂COOR |
| Methylenemalonic acid | —H | —H | —COOR |

The preferred α,β-unsaturated esters are those of methacrylic acid.

Some of the α,β-unsaturated esters needed to prepare the polymeric thiosynergists of this invention are commercially available such as 2-(ethylthio)ethyl methacrylate.

The α,β-unsaturated esters may also be prepared by a variety of classical organic procedures for preparing esters by reacting a thioalcohol of the formula

with an acid halide, anhydride or lower alkyl ester of an α,β-unsaturated acid of the formula

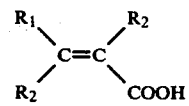

$R_1$-$R_4$ are as defined above.

The acid halides, anhydrides and lower alkyl esters of the α,β-unsaturated acids are generally commercially available as for example, acrylyl chloride, methacrylyl chloride, cinnamoyl chloride, fumaryl chloride; maleic anhydride, citraconic anhydride; dimethyl itaconate, diethyl maleate and the like.

A number of thioalcohols are also commercially available such as 2-(ethylthio)ethanol, 2-(isopropylthio) ethanol, 2-(n-octylthio)ethanol, 2-(n-dodecylthio)ethanol and the like.

The thioalcohols of the formula $R_4SC_nH_{2n}OH$ can also be prepared by reacting a mercaptan $R_4SH$ with an oxirane such as ethylene oxide, propylene oxide or butylene oxide.

The polymeric thiosynergists of this invention can be obtained by conventional free radical polymerization processes. Thus, for instance, an α,β-unsaturated ester monomer described above is brought into contact with a catalytic amount of a free-radical polymerization catalyst or initiator. Typical free-radical polymerization catalysts include, for instance, azo compounds, such as azo-1,1'-diisobutyronitrile, azo-2,2'-diisobutyronitrile, dimethyl azo-2,2'-diisobutyrate, azo-2,2'-bis(2,4-dimethylvaleronitrile), azo-2,2'-diisobutyramide, etc.; peroxides, such as hydrogen peroxide, sodium peroxide, peracetic acid, acetyl peroxide, benzoyl peroxide, potassium persulfate, calcium percarbonate, etc.; alkylborons such as tributylboron etc., and the like. The catalyst is ordinarily incorporated in the polymerization reaction mixture in a concentration of from about 0.01 to about 5 percent or more by weight, and preferably from about 0.2 to about 2 percent by weight, based upon the weight of the monomers, although any catalytic amount thereof can be utilized.

The polymerization can be carried out by any number of conventional polymerization techniques such as bulk, suspension, emulsion, solution, etc. Bulk polymerization and solution polymerization in inert hydrocarbon solvents such as benzene, toluene, xylene, hexane, heptane, cyclohexane, petroleum ether, etc. are preferred.

The molecular weights of the polymeric thiosynergists of this invention can be controlled by the judicious use of chain transfer agents during the free radical polymerization. As seen in Examples 2-8, the presence of 0 to 16 mol% n-dodecyl mercaptan based on the 2-(ethylthio)-ethyl methacrylate being polymerized resulted in a polymer molecular weight ranging from 9,390 to 1,120 using a solution polymerization in benzene.

The poly[2-(alkylthio)ethyl methacrylates] of this invention are known in the prior art as having utility in a number of different end use areas. However, their use as thiosynergists to improve the effectiveness of numerous other compounds which are used as stabilizers for organic materials normally subject to thermal and oxidative deterioration has not been disclosed or suggested. Thus while the compounds of the present invention may be considered as stabilizers in their own right, their properties are such that they would be more conventionally classified as "synergists" in that when combined with known stabilizers, they exhibit the ability to increase stabilization to a degree far exceeding that which would be expected from the additive properties of the individual components.

The instant polymeric [2(alkylthio)ethyl methacrylates] are particularly effective in preventing the deterioration of organic substrates in combination with various phenolic antioxodants.

The compositions of matter of this invention which are stabilized against deterioration comprise
(a) an organic material normally subject to deterioration,
(b) from 0.005 to 5% by weight of the organic material (a) of a phenolic antioxidant, and
(c) from 0.005 to 5% by weight of the organic material (a) of a polymeric thiosynergist of formula I.

The organic materials (a) of the stabilized compositions of this invention are selected from the following:

1. Polymers which are derived from hydrocarbons with single or double unsaturation, such as polyolefins, for example, polyethylene, which can optionally be cross-linked, polypropylene, polyisobutylene, polymethylbutene-1, polymethylpentene-1, polybutene-1, polyisoprene, polybutadiene, polystyrene, polyisobutylene, copolymers of the monomers on which the homopolymers mentioned are based, such as ethylene/propylene copolymers, propylene/butene-1 copolymers, propylene/isobutylene copolymers, styrene/butadiene copolymers and terpolymers of ethylene and propylene with a diene, such as for example, hexadiene, dicyclopentadiene or ethylidene-norbornene; mixtures of the above mentioned homopolymers, such as for example, mixtures of polypropylene and polyethylene, polypropylene and polybutene-1, or polypropylene and polyisobutylene.

2. Vinyl polymers containing halogen, such as polyvinyl chloride, polyvinyldene chloride, polyvinyl fluoride, but also polychloroprene and chlorinated rubbers.

3. Polymers which are derived from α,β- unsaturated acids and their derivatives, such as polyacrylates and polymethacrylates, polyacrylamides and polyacrylonitrile, as well as their copolymers with other vinyl compounds, such as acrylonitrile/butadiene/styrene, acrylonitrile/styrene and acrylonitrile/sturene/acrylic ester copolymers.

4. Polymers which are derived from unsaturated alcohols and amines or their acyl derivatives or acetals, such as polyvinyl alcohol, polyvinyl acetate, polyvinyl stearate, polyvinyl benzoate, polyvinyl maleate, polyvinyl butyral, polyallyl phthalate, polyallyl melamine and their copolymers with other vinyl compounds, such as ethylene/vinyl acetate copolymers.

5. Homopolymers and copolymers which are derived from epoxides, such as polyethylene oxide or the polymers which are derived from bis-glycidyl ethers.

6. Polyacetals, such as polyoxymethylene and polyoxyethylene, as well as those polyoxymethylenes which contain ethylene oxide as the comonomer.

7. Polyphenylene oxides.

8. Polyurethanes and polyureas.

9. Polycarbonates.

10. Polysulfones.

11. Polyamides and copolyamides which are derived from diamines and dicarboxylic acids and/or from aminocarboxylic acids or the corresponding lactams, such as polyamide 6, polyamide 6/6, polyamide 6/10, polyamide 11 and polyamide 12.

12. Polyesters which are derived from dicarboxylic acids and dialcohols and/or from hydroxycarboxylic acids of the corresponding lactones, such as poly(ethylene glycol terephthalate) or poly-(1,4-dimethylolcyclohexane terephthalate).

13. Crosslinked polymers which are derived from aldehydes on the one hand and phenols, ureas and melamines on the other, such as phenol-formaldehyde, urea-formaldehyde and melamine-formaldehyde resins.

14. Alkyd resins, such as glycerine-phthalic acid resins and their mixtures with melamine-formaldehyde resins.

15. Unsaturated polyesters resins which are derived from copolyesters of saturated and unsaturated dicarboxylic acids with polyhydric alcohols, with vinyl compounds as crosslinking agents, and also their halogen-containing modifications of low flammability.

16. Natural polymers such as cellulose, rubber, proteins and their polymer-homologously chemically modified derivatives, such as cellulose acetates, cellulose propionates and cellulose butyrates, or the cellulose ethers, such as methylcellulose.

17. High molecular monomeric substances, for example, mineral oils, animal and vegetable fats, oils and waxes, or oils, waxes and fats based on synthetic esters.

The compounds of this invention are particularly useful for the protection of polyolefins, for instance polyethylene, polypropylene, poly(butene-1), poly(pentene-1), poly(3-methylbutene-1), poly(4-methylpentene-1), various ethylene/propylene copolymers and the like.

For addition to polymeric substrates, the stabilizers can be blended before polymerization or after polymerization, during the usual processing operations, for example, by hot-milling, the composition then being extruded, pressed, blow-molded or the like into films, fibers, filaments and the like. The heat stabilizing properties of these compounds may advantageously stabilize the polymer against degradation during such processing at the high temperature generally encountered. The stabilizers can also be dissolved in suitable solvents and sprayed on the surface of films, fabrics, filaments or the like to provide effective stabilization. Where the polymer is prepared from a liquid monomer as in the case of styrene, the stabilizer may be dispersed or dissolved in the monomer prior to polymerization or curing.

In the case of crosslinked polyethylene, the compounds are added before the crosslinking.

The phenolic antioxidants (b) of the stabilized compositions of this invention are selected from the following:

1. Antioxidants 1.1 Simple 2,6-dialkylphenols, such as, for example, 2,6-di-tert.-butyl-4-methylphenol, 2-tert.-butyl-4,6-dimethylphenol, 2,6-di-tert.-butyl-4-methoxymethylphenol, 2,6-dioctadecyl-4-methylphenol, 2,6-di-tert-butyl-4-butylphenol.

1.2 Derivatives of alkylated hydroquinones, such as, for example, 2,5-di-tert.-butyl-hydroquinone, 2,5-tert.-amylhydroquinone, 2,6-di-tert.-butyl-hydroquinone, 2,5-di-tert.-butyl-4-hydroxy-anisole, 3,5-di-tert.-butyl-4-hydroxyanisole, tris-(3,5-di-tert.-butyl-4-hydroxyphenyl)-phosphite, 3,5-di-tert.-butyl-4-hydroxyphenyl stearate and bis-(3,5-di-tert.-butyl-4-hydroxyphenyl) adipate.

1.3 Hydroxylated thiodiphenyl ethers, such as, for example, 2,2'-thio-bis-(6-tert.-butyl-4-methylphenol), 2,2'-thio-bis-(4-octylphenol), 4,4'-thio-bis-(6-tert.-butyl-3-methylphenol), 4,4'-thio-bis-(3,6-di-sec.-amylphenol), 4,4'-thio-bis-(6-tert.-butyl-2-methylphenol) and 4,4'-bis-(2,6-dimethyl-4-hydroxyphenyl)disulfide.

1.4 Alkylidene-bisphenols, such as, for example, 2,2'-methylene-bis-(6-tert.-butyl-4-methylphenol), 2,2'-methylene-bis-(6-tert.-butyl-4-ethylphenol), 4,4'-methylene-bis-(6-tert.-butyl-2-methylphenol), 4,4'-methylene-bis-(2,6'-di-tert.-butyl-phenol), 2,6-di-(3-tert.-butyl-5-methyl-2-hydroxybenzyl)-4-methylphenol, 2,2'-methylene-bis-[4-methyl-6-(α-methylcyclohexyl)-phenol], 1,1-bis-(3,5-dimethyl-2-hydroxyphenyl)butane, 1,1-bis-(5-tert.-butyl-4-hydroxy-2-methylphenyl)-butane, 2,2-bis-(5-tert.-butyl-4-hydroxy-2-methylphenyl)-butane, 2,2-bis-(3,5-di-tert.-butyl-4-hydroxyphenyl)-propane, 1,1,3-tris-(5-tert.-butyl-4-hydroxy-2-methylphenyl)-butane, 2,2-bis-(5-tert.-butyl-4-hydroxy-2-methylphenyl)-4-n-dodecylmercapto-butane, 1,1,5,5-tetra-(5-tert.-butyl-4-hydroxy-2-methylphenyl)-pentane and ethylene glycol bis-[3,3-bis-(3'-tert.-butyl-4'-hydroxyphenyl)-butyrate].

1.5 O-, N- and S-benzyl compounds, such as for example, 3,5,3',5'-tetra-tert.-butyl-4,4'-dihydroxydibenzyl ether, 4-hydroxy-3,5-dimethylbenzyl-mercaptoacetic acid octadecyl ester, tris(3,5-di-tert.-butyl-4-hydroxybenzyl)-amine and bis-(4-tert.-butyl-3-hydroxy-2,6-dimethylbenzyl)-dithioterephthalate.

1.6 Hydroxybenzylated malonic esters, such as, for example, 2,2-bis-(3,5-di-tert.-butyl-2-hydroxybenzyl)-malonic acid dioctadecyl ester, 2-(3-tert.-butyl-4-hydroxy-5-methylbenzyl)-malonic acid dioctadecyl ester, 2,2-bis-(3,5-di-tert.-butyl-4-hydroxybenzyl)-malonic acid didodecylmercaptoethyl-ester and 2,2-bis-(3,5-di-tert.-butyl-4-hydroxybenzyl-malonic acid di-[4-(1,1,3,3-tetramethylbutyl)-phenyl]-ester.

1.7 Hydroxybenzyl-aromatics, such as, for example, 1,3,5-tri-(3,5-di-tert.-butyl-4-hydroxybenzyl)-2,4,6-trimethylbenzene, 1,4-di-(3,5-di-tert.-butyl-4-hydroxybenzyl)-2,3,5,6-tetramethylbenzene and 2,4,6-tri-(3,5-di-tert.-butyl-4-hydroxybenzyl)-phenol.

1.8 s-Triazine compounds, such as, for example, 2,4-bis-octylmercapto-6-(3,5-di-tert.-butyl-4-hydroxy-anilino)-s-triazine, 2-octylmercapto-4,6-bis-(3,5-di-tert-butyl-4-hydroxy-anilino)-s-triazine, 2-octylmercapto-4,6-bis-(3,5-di-tert.-butyl-4-hydroxyphenoxy)-s-triazine, 2,4,6-tris-(3,5-di-tert.-butyl-4-hydroxyphenoxy)-s-triazine, 2,4,6-tris-(3,5-di-tert.-butyl-4-hydroxyphenylethyl)-2-triazine and 1,3,5-tris-(3,5-di-tert.-butyl-4-hydroxybenzyl) isocyanurate.

1.9 Amides of β-(d,5-di-tert.-butyl-4-hydroxyphenyl)-propionic acid, such as, for example, 1,3,5-tris-(3,5-di-tert.-butyl-4-hydroxyphenylpropionyl)hexahydro-s-triazine and N,N'-di-(3,5-di-tert.-butyl-4-hydroxyphenylpropionyl)hexamethylenediamine.

1.10 Esters of β-(3,5-di-tert.-butyl-4-hydroxyphenyl)-propionic acid with monohydric or polyhydric alcohols, such as, for example, methanol, ethanol, octadecanol, 1,6-hexanediol, 1,9-nonanediol, ethylene glycol, 1,2-propanediol, diethylene glycol, triethylene glycol, thiodiethylene glycol, neopentyl glycol, pentaerythritol, 3-thia-undecanol, 3-thia-pentadecanol, trimethylhexanediol, trimethylolethane, trimethylolpropane, tris-hydroxyethyl isocyanurate and 4-hydroxymethyl-1-phospha-2,6,7-trioxabicyclo[2.2.2]octane.

1.11 Esters of β-(5-tert.-butyl-4-hydroxy-3-methylphenyl)-propionic acid with monohydric or polyhydric alcohols, such as, for example, methanol, ethanol, octadecanol, 1,6-hexanediol, 1,9-nonanediol, ethylene glycol, 1,2-propanediol, diethylene glycol, thiodiethylene glycol, neopentyl glycol, pentaerythritol, 3,-thia-undecanol, 3-thia-pentadecanol, trimethylhexanediol, trimethylolethane, trimethylolpropane, tris-hydroxyethyl isocyanurate and 4-hydroxymethyl-1-phospha-2,6,7-trioxabicyclo[2.2.2]octane.

1.12 Esters of 3,5-di-tert.-butyl-4-hydroxyphenylacetic acid with monohydric or polyhydric alcohols, such as, for example, with methanol, ethanol, octadecanol, 1,6-hexanediol, 1,9-nonanediol, ethylene glycol, 1,2-propanediol, diethylene glycol, thiodiethylene glycol, neopentyl glycol, pentaerythritol, 3-thia-undecanol, 3-thia-pentadecanol, 3-thia-heneicosanol-1, trimethylhexane-diol, trimethylolethane, trimethylolpropane, tris-hydroxyethyl isocyanurate and 4-hydroxymethyl-1-phospha-2,6,7-trioxabicyclo[2.2.2]-octane.

1.13 Acylaminophenols, such as, for example, N-(3,5-di-tert.-butyl-4-hydroxyphenyl)stearic acid amide, N,N'-di-(3,5-di-tert-butyl-4-hydroxyphenyl)-thiobis-acetamide and thiophosphoric acid O,O-diethyl ester 3,5-di-tert.-butyl-4-hydroxyanilide.

1.14 Benzylphosphonates, such as, for example, 3,5-di-tert.-butyl-4-hydroxybenzylphosphonic acid dimethyl ester, 3,5-di-tert.-butyl-4-hydroxybenzylphosphonic acid diethyl ester, 3,5-di-tert.-butyl-4-hydroxybenzylphosphonic acid dioctadecyl ester and 5-tert.-butyl-4- hydroxy-3-methylbenzylphosphonic acid dioctadecyl ester.

Although the compounds of this invention are to some degree effective as thermal stabilizers, if the processing of the polymer is carried out at high temperatures, it is advantageous to incorporate additional antioxidants.

In most applications, it is desirable to incorporate into the resin composition, sufficient thermal antioxidants to protect the plastic against thermal and oxidative degradation. The amount of antioxidant required will be from about 0.005% to 5% and preferably from 0.01% to 2% by weight.

The best results have been obtained with the preferred class of thermal antioxidants, the hindered phenols. These compounds have been found to provide the best thermal stabilization in the compositions of the invention. Among this preferred class of thermal antioxidants may be mentioned the following:

di-n-octadecyl 3,5-di-butyl-4-hydroxybenzylmalonate 2,6-di-t-butyl-4-methylphenol 2,2'-methylene-bis(6-t-butyl-4-methylphenol)

2,6-di-t-butylhydroquinone octadecyl (3,5-di-t-butyl-4-hydroxybenzylthio)-acetate 1,1,3-tris(-t-butyl-6-methyl-4-hydroxyphenyl)-butane 1,4-bis(3,5-di-t-butyl-4-hydroxybenzyl)-2,3-5,6-tetramethylbenzene 2,4-bis-(3,5-di-t-butyl-4-hydroxyphenoxy)-6-(n-octyl-thio)-1,3,5-triazine 2,4-bis-(4-hydroxy-3,5-di-t-butylphenoxy)-6-(n-octylthioethylthio)-1,3,5-triazine 2,4-bis-(n-octylthio)-6-(3,5-di-t-butyl-4-hydroxyanilino)-1,3,5-triazine 2,4,6-tris-(4-hydroxy-3,5-di-t-butylphenoxy)-1,3,5-triazine n-octadecyl β-(3,5-di-t-butyl-4-hydroxyphenyl)-propionate 2,4,6-tris(3,5-di-tert-butyl-4-hydroxybenzyl) isocyanurate di-n-dodecyl 6-tert-butyl-2,3-dimethyl-4-hydroxybenzylphosphonate stearamido N,N-bis-[ethylene 3-(3,5,-di-t-butyl-4-hydroxyphenyl)propionate]

1,2-propylene glycol bis[3-(3,5-di-t-butyl-4-hydroxyphenyl)propionate]

pentaerythritol tetrakis-[3-(3,5-di-t-butyl-4-hydroxyphenyl)propionate]

dioctadecyl 3,5-di-t-butyl-4-hydroxybenzylphosphonate di-n-octadecyl 1-(3,5-di-t-butyl-4-hydroxyphenyl)-ethanephosphonate.

The above phenolic hydrocarbon stabilizers are known and many are commercially available.

The above exemplified antioxidants and other related antioxidants which are incorporated herein by reference, are disclosed in greater detail in the following patents:

Netherlands Patent Specification No. 67/1119, issued Feb. 19, 1968; Netherlands Patent Specification No. 68/03498, issued Sept. 18, 1968; U.S. Pat. Nos. 3,255,191; 3,330,859; 3,644,482; 3,281,505; 3,531,483; 3,285,855; 3,364,250; 3,368,997; 3,357,944 and 3,758,549.

In addition to one or more of the above phenolic stabilizers, it is often advantageous to employ other additives such as ultraviolet light absorbers, e.g., 2-hydroxy-4-methoxybenzophenone, 2-(2-hydroxy-5-methylphenyl)benzotriazole, etc.; various phosphite compounds such as trioctyl phosphite, dilauryl phosphite, tris(nonylphenyl) phosphite, 3,9-bis(n-octadecyloxy)-2,4,8,10-tetraoxa-3,9-diphosphaspiro[5.5]undecane and the like. Such two, three or four component systems, when including a compound of the present invention, exhibit far superior properties to the additive properties of the individual components.

Other materials often added to such organic materials, depending upon the substrate, include pourpoint depressants, corrosion and rust inhibitors, metal deactivators, demulsifiers, antifoams agents, carbon black, accelerators, plasticizers, color stabilizers, heat stabilizers, dyes, pigments, lubricants, emulsifiers, fillers, asbestos, kaolin, talc, glass fibers, optical brighteners, flameproofing agents, antistatic agents, dispersing agents, antiozonants, metal chelating agents, dyesites, chemicals used in rubber compounding and the like.

In general, the stabilizers of this invention are employed from about 0.005 to about 5% by weight of the organic material (a) of the stabilized composition, although this will vary with the particular substrate and application. An advantageous range is from about 0.05 to about 2%, and especially 0.1 to about 1%.

The polymeric thiosynergists of formula I are particularly useful in compositions used in wire and cable insulation wherein the composition is in extended contact with petrolatum at elevated temperatures. Resistance to extraction of the stabilizers from the polymeric composition is essential for long-term operation of such systems.

In these wire and cable compositions the organic materials (a) found most useful include polyolefins such as polypropylene, polyethylene, ethylene/propylene copolymers, chlorinated polyethylene and crosslinked polyethylene. The phenolic antioxidants (b) having particularly efficacious effects in these compositions are neopentanetetrayl tetrakis[3,5-di-tert-butyl-4-hydroxyhydrocinnamate], 2,4,6-tris(3,5-di-tert-butyl-4-hydroxybenzyl) isocyanurate, 1,3,5-tris(3,5-di-tert-butyl-4-hydroxybenzyl)-2,4,6-trimethylbenzene, 1,1,3-tris(3-tert-butyl-6-methyl-4-hydroxyphenyl)butane and N,N'-bis(3,5-di-tert-butyl-4-hydroxyhydrocinnamoyl)-hydrazine.

The following examples are presented for the purpose of illustration only and are not to be construed to limit the nature or scope of the instant invention in any manner whatsoever.

EXAMPLES 1–7

Poly[2-(ethylthio)ethyl methacrylate]

2-(Ethylthio)ethyl methacrylate (8.7 grams, 0.05 mole) and azobisisobutyronitrile (43.5 milligrams or 0.5% based on the methacrylate) were sealed with or without n-dodecyl mercaptan as chain transfer agent and benzene as solvent in an ampule under nitrogen and then polymerized for 18 hours at 80° C. After the polymerization was complete, the contents of the ampule were transferred to a round-bottom flask, and the solvent and residual monomer were evaporated under high vacuum till a constant weight was obtained in each example. The polymers and oligomers of 2-ethylthioethyl methacrylate were colorless, tacky to highly viscous materials. Their molecular weights were determined by vapor pressure osmometry (VPO). The molecular weight data show that increasing amounts of chain transfer agent decrease the polymer molecular weight as expected. Details of these examples are given on Table I.

TABLE I

Polymerization of 2-(Ethylthio)ethyl Methacrylate (8.7 grams, 0.05 mole) in bulk or solution and with or without n-dodecyl mercaptan as chain transfer agent

| Example (Compound) | n-Dodecyl Mercaptan Grams | n-Dodecyl Mercaptan Moles | Solvent Benzene Grams | Polymer Appearance | Average Molecular Weight $\overline{M}_n$(VPO) |
|---|---|---|---|---|---|
| 1 (1) | None | None | None | white, rubbery | 15,600 |
| 2 (2) | None | None | 8.7 | white, rubbery | 7,399 |
| 3 (3) | 0.101 | 0.0005 | 8.7 | very viscous oil | 5,228 |
| 4 (4) | 0.202 | 0.001 | 8.7 | very viscous oil | 3,570 |
| 5 (5) | 0.404 | 0.002 | 8.7 | very viscous oil | 2,606 |
| 6 (6) | 0.808 | 0.004 | 8.7 | very viscous oil | 1,775 |
| 7 (7) | 1.616 | 0.008 | 8.7 | very viscous oil | 1,120 |

EXAMPLE 8

Poly[2-(ethylthio)ethyl methacrylate]

2-Ethylthioethyl methacrylate (100 grams), azobisisobutyronitrile (1.0 gram) and benzene (100 grams) were charged to an ampule, sealed under nitrogen and kept in a constant temperature oil bath for 17 hours at 70° C. to carry out the polymerization of the methacrylate monomer. The resulting polymer solution was then cooled and diluted with a further 100 grams of benzene. The resulting solution was then frozen and subjected to high vacuum freeze drying until no further weight loss was observed. The resulting polymer was a tough, white, soft material with a second order transition temperature (Tg) of $-20°$ C. and an average molecular weight ($\overline{M}_n$, by VPO) of 9,390. Yield was essentially quantitative. (Compound 8)

EXAMPLE 9

2-(n-Octylthio)ethyl methacrylate

2(n-Octylthio)ethanol (13.10 grams, 0.0688 mole) and anhydrous pyridine (65.5 grams) were charged to a three-necked flask fitted with a condenser protected with a drying tube, dropping funnel, thermometer and magnetic stirrer. The solution was cooled to 5° C., and methacrylyl chloride (7.20 grams, 0.0688 mole) was then added dropwise over a 26-minute period. The reaction solution was maintained at 9°–11° C. throughout the addition period, and then at 25° C. for another three hours with stirring. The reaction mixture was then diluted with 150 ml of benzene, and the pyridine hydrochloride present was removed by filtration. The filtrate was washed twice with dilute hydrochloric acid, then with water until neutral and finally dried over anhydrous sodium sulfate. The benzene solvent was stripped off leaving 13.1 grams of crude product which was purified by vacuum distillation to yield 11.8 grams of the desired ester with a boiling point of 111°–124° C./0.07 mm in a yield of 66%.

NMR data are consistent for the above named structure.

EXAMPLES 10-17

In like manner, other esters can be prepared by reacting a variety of readily available thioalcohols with unsaturated acid chlorides, esters or anhydrides as seen in Table II below:

TABLE II

Unsaturated Thioalkyl Esters

| Example | $\alpha,\beta$-Unsaturated Acid Derivatives | Thioether Alcohols | $\alpha,\beta$-Unsaturated Ester Monomers |
|---|---|---|---|
| 10 | $CH_2=CHCOCl$ | $CH_3CH_3SCH_2CH_2OH$ | $CH_2=CHCOOCH_2CH_2SC_2H_5$ |
| 11 | $CH_2=C(CH_3)COCl$ | $(CH_3)_2CHSCH_2CH_2OH$ | $CH_2=C(CH_3)COOCH_2CH_2SCH(CH_3)_2$ |
| 12 | $[\!=\!CHCOCl]$ trans | $2\ CH_3(CH_2)_3SCH_2CH_2OH$ | $[\!=\!CHCOOCH_2CH_2S(CH_2)_3CH_3]_2$ trans |
| 13 | $[\!=\!CHCOOCH_3]_2$ cis | $2\ CH_3(CH_2)_{11}SCH_2CH_2OH$ | $[\!=\!CHCOOCH_2CH_2S(CH_2)_{11}CH_3]_2$ cis |
| 14 | $CH_2=CCOCl$<br>$\|$<br>$CH_2COCl$ | $2\ CH_3(CH_2)_{15}SCH_2CH_2OH$ | $CH_2=CCOOCH_2CH_2S(CH_2)_{15}CH_3$<br>$\|$<br>$CH_2COOCH_2CH_2S(CH_2)_{15}CH_3$ |
| 15 | $CH_2=CHCOOC_2H_5$ | $C_2H_5SCH_2CH(CH_3)OH$ | $CH_2=CHCOOCH(CH_3)CH_2SC_2H_5$ |
| 16 | CH—CO<br>‖    \<br>‖     O<br>‖    /<br>CH—CO | $2\ CH_3(CH_2)_7S(CH_2)_4OH$ | $[\!=\!CHCOO(CH_2)_4S(CH_2)_7CH_3]$ cis |
| 17 | $[\!=\!CHCOCl]_2$ trans | $2\ C_2H_5S(CH_2)_{18}OH$ | $[\!=\!CHCOO(CH_2)_{18}SC_2H_5]_2$ trans |

EXAMPLE 18

Poly[2-(n-octylthio)ethyl methacrylate]

2-(n-Octylthio)ethyl methacrylate (10 grams, prepared in Example 9), n-dodecyl mercaptan (0.1 gram), azobisisobutyronitrile (0.2 grams) and benzene (30 grams) were sealed in an ampule under nitrogen and kept at 70° C. for 17 hours to effect polymerization. The resulting polymer solution was diluted with another 30 grams of benzene, and then added dropwise into 600 ml of methanol with vigorous stirring. A white polymer precipitated, was separated by filtration and dried under high vacuum to give 9.2 grams of the above named polymer. (Compound 9).

EXAMPLE 19

Unstabilized ethylene/propylene copolymer (Hercules SB 272) was thoroughly blended with 0.4% by weight of a polymeric thiosynergist of this invention. The blended materials were than milled on a two-roll mill at 182° C. for 10 minutes after which time the stabilized polypropylene was sheeted from the mill and allowed to cool.

The milled polypropylene sheets were then cut into pieces and pressed for 7 minutes on a hydraulic press at 218° C. at 275 psi (19.25 Kg/cm$^2$) pressure and then transferred to a cold press at 275 psi (19.25 Kg/cm$^2$). Sample films of 10 mil (0.254 mm) thickness were obtained.

Extraction resistance of the polymeric thiosynergist was measured by immersing a 1"×4" (2.54 cm×9.16 cm) strip of the 10 mil (0.254 mm) film prepared above in 200 grams of Witco Cable Compound #11, a petroleum jelly stabilized with 0.5% by weight of a phenolic antioxidant, pentaerythritol tetrakis[3,5-di-tert-butyl-4-hydroxyhydrocinnamate], in a 250 ml beaker at a temperature of 70° C. or of 85° C. for 5, 10, 12 or 15 days. Test films were removed at the end of each test period wiped clean of any residual cable compound and analyzed for residual polymeric thiosynergist by X-ray fluorescence analysis. Results are given on Table III below including control thiosynergists.

| | Extraction Resistance Thiosynergists | | | | | |
|---|---|---|---|---|---|---|
| | | Concentration* After Extracted in Witco Cable Compound #11 | | | | |
| | | at 70° C. | | | at 88° C. | |
| Thiosynergist | Initial Conc* | 5 days | 12 days | 15 days | 5 days | 12 days |
| Compound 8 | 0.37 | 0.37 | 0.38 | 0.37 | 0.36 | 0.39 |
| DSTDP** | 0.40 | 0.08 | 0.09 | 0.09 | 0.11 | 0.13 |
| Compound Ex. 4 U.S. Pat. No. 3,758,549 | 0.37 | 0.06 | 0.05 | 0.04 | 0.06 | 0.05 |
| Compound Ex. 1 U.S. Pat. No. 3,538,092 | 0.39 | 0.04 | 0.04 | 0.03 | 0.06 | 0.04 |
| Compound Ex. 2 U.S. Pat. No. 3,652,561 | 0.42 | 0.04 | 0.02 | 0.02 | 0.03 | 0.03 |
| Compound Ex. 20 SN 309,309, CIP appln of U.S. Pat. No. 3,378,516 | 0.42 | 0.40 | 0.39 | 0.37 | 0.39 | 0.40 |

*Concentration in percent by weight
**Distearyl thiodipropionate

As seen from Table III the instant polymeric thiosynergist was not extracted from the polypropylene even after prolonged treatment by the Witco Cable Compound #11 at elevated temperatures. All the control thiosynergists which were monomeric in structure were extracted readily under the same conditions. The linear thiodialkanate glycol polyester synergist (Compound Ex 20, Ser. No. 309,309) also resisted extraction in this test.

EXAMPLE 20

Unstabilized ethylene/propylene copolymer (Hercules SB 272) was thoroughly blended with 0.4% by weight of a polymeric synergist of this invention, 0.2% by weight of a phenolic antioxidant, pentaerythritol tetrakis[3,5-di-tert-butyl-4-hydroxyhydrocinnamate], and 0.2% by weight of an antioxidant and metal deactivator, N,N'-bis(3,5-di-tert-butyl-4-hydroxyhydrocinnamoyl) hydrazine. 10 mil (0.254 mm) films were then prepared from thus stabilized copolymer by the method described in Example 19.

Square pieces (0.5"×0.5", 1.27 cm×1.27 cm) of 100 mesh copper screen were placed between two 10 mil (0.254 mm) films prepared above and compression molded at 185° C. into a laminate structure at 350 psi (24.5 Kg/cm² for 5 minutes.

Test samples were so cut from the above laminates as to assure that the imbedded copper screen was not exposed directly to the air.

The laminate test samples containing the completely imbedded copper screen were dipped into Witco Cable Compound #11 held at 115° C. for a period of 1 second and then heated for 10 days at 70° C. At the end of this period, the petroleum jelly coating remaining on the laminate test samples was wiped away. The laminate test samples were then placed in a forced draft oven at 150° C. to measure the resistance to accelerated aging afforded by the stabilizer composition. When the laminates showed the first signs of decomposition (e.g., cracking or brown edges), they were considered to have failed.

The laminates subjected to the 10 day 70° C. oven heating with a petroleum jelly coating (from the Witco Cable Composition #11) were exposed to the possible extraction of the stabilizer composition including the thiosynergist by the petroleum jelly.

Duplicate laminate test samples which had not been treated with the petroleum jelly coating were also oven agen at 150° C. as unextracted control samples. Results are shown on Table IV below:

Table IV

| | Oven Aging Ethylene/Propylene/Copper Screen Laminate Films | |
|---|---|---|
| Thiosynergist | Extracted* Hours to Failure | Non-Extracted Hours to Failure |
| None | 720 | 1315 |
| Compound 8 | 1068 | 1344 |
| DSTDP** | 773 | 1366 |
| Compound Ex. 4 U.S. Pat. No. 3,758,549 | 720 | 705 |
| Compound Ex. 1 U.S. Pat. No. 3,538,092 | 1015 | 1310 |
| Compound Ex. 2 U.S. Pat. No. 3,652,561 | 654 | 792 |
| Compound Ex. 20 SN 309,309, CIP appln of U.S. Pat. No. 3,378,516 | 718 | 976 |

*Treated with petroleum jelly at 70° C. for 10 days before oven aging
**distearyl β-thiodipropionate The large quantity (total of 0.4% by weight phenolic antioxidants) used in this test militated against the thiosynergists exhibiting their usual dramatic increases in hours to failure values. Accordingly, the unsynergized composition as well as those with DSTDP, the Compound of U.S. Pat. No. 3,538,092 and instant Compound 8 exhibited essentially comparable hours to failure values when non-extracted. The other three compositions (non-extracted) including a polymeric thiosynergist (Compound Ex. 20, Ser. No. 309,309) gave surprisingly low hours to failure values as if the thiosynergist additives in these three cases had almost a counter-synergist effect.

Upon extraction, all compositions gave results essentially comparable to the extracted composition having no thiosynergist present except for the extracted composition containing instant Compound 8 and the extracted composition containing the thiosynergist of Example 4 of U.S. Pat. No. 3,538,092. Extraction data seen in Example 19 indicate that the instant polymeric thiosynergist resists extraction and is still present after extraction. As is seen with the extracted composition containing no thiosynergist, considerable antioxidant stabilizer has been lost from such systems thus allowing the polymeric thiosynergist present to exert its normal, great synergistic effects.

Extraction data in Example 19 indicate that the other polymeric thiosynergist also resists extraction, but as seen above it does not exert a beneficial synergist effect in this antioxidant system.

Extraction data in Example 19 indicate that the compound of Example 4, U.S. Pat. No. 3,538,092 is largely removed by extraction, yet the extracted composition still exhibits good hours to failure values. This result is not clearly understood.

EXAMPLE 21

Unstabilized polypropylene powder (Hercules Profax 6501) was thoroughly blended with 0.3% by weight of the various polymeric compounds of this invention and 0.1% by weight various phenolic antioxidants. The blended materials were then milled on a two-roll mill at 182° C. for 10 minutes, after which time the stabilized polypropylene was sheeted from the mill and allowed to cool.

The milled polypropylene sheets were then cut into pieces and pressed for 7 minutes on a hydraulic press at 218° C. on a hydraulic press at 275 psi (19.25 Kg/cm$^2$) pressure and then transferred to a cold press the same pressure. Sample plaques of the resulting 25 mil (0.635 mm) sheet were tested for resistance to accelerated aging in a forced draft oven at 150° C. When the plaques showed the first sign of decomposition (e.g., cracking or brown edges), they were considered to have failed. The results are shown on Table V below:

TABLE V

| 150° C. Oven Aging of Polypropylene Plaques | |
|---|---|
| Percent Stabilizer | Hours to Failure |
| Unstabilized polypropylene | 3 |
| 0.1% IRGANOX 1010* | 820 |
| 0.1% IRGANOX 1010 plus 0.3% DSTDP** | 1565 |
| 0.1% IRGANOX 1010 plus 0.3% Compound 8, first sample | 1245 |
| 0.1% IRGANOX 1010 plus 0.3% Compound 1 | 1390 |
| 0.1% IRGANOX 1010 plus 0.3% Compound 8, second sample | 1165 |
| 0.1% IRGANOX 1010 plus 0.4% Compound 9 | 1322 |

*IRGANOX 1010, neopentanetetrayl tetrakis[3,5-di-tert-butyl-4-hydroxyhydrocinnamate]
**DSTDP, distearyl β-thiodipropionate

EXAMPLE 22

A quantity of SBR emulsion containing 100 grams of rubber (500 ml of 20% SRB emulsion obtained from Texas U.S., as Synpol 1500) previously stored under nitrogen, is placed in a beaker and stirred vigorously. The pH of the emulsion is adjusted to 10.5 with a 0.5 N NaOH solution.

To the emulsion is added 50 ml of 25% NaCl solution. A 6% NaCl solution adjusted with hydrochloric acid to a pH 1.5 is added in a thin stream with vigorous stirring. When pH 6.5 is reached, the rubber begins to coagulate and the addition is slowed down in order to maintain uniform agitation. The addition of the acidic 6% NaCl solution is terminated when a pH 3.5 is reached. The coagulated crumb-rubber slurry at pH 3.5 is stirred for ½ hour.

The coagulated rubber is isolated by filtration through cheese cloth, and rinsed with distilled water. After three subsequent washings with fresh distilled water, the coagulated rubber is dried, first at 25 mm Hg and finally to constant weight under high vacuum (1 mm) at 40°-45° C.

The dried rubber (25 g) is heated under nitrogen at 125° C. in a Brabender mixer and to this is added with mixing 1.25 gram (0.5%) of 1,3,5-tri(3,5-di-t-butyl-4-hydroxybenzyl)-2,4,6-trimethylbenzene and 0.1% by weight of poly[2-(n-butylthio)ethyl methacrylate].

Portions of the rubber composition are heated in a circulating air oven at 100° C. for up to 96 hours. The viscosity of a 0.5% toluene solution of aged and unaged rubber samples are determined at 25° C. Stabilizer effectiveness is judged by the percent retention of specific viscosity, color formation and gel content after oven aging. The stabilized rubber has better viscosity, color retention, and less gel content than the rubber which is unstabilized after oven aging.

Similar results are obtained when n-octadecyl 3-(3,5-di-t-butyl-4-hydroxyphenyl)propionate and poly[2-(n-dodecylthio)ethyl methacrylate] are used in place of the above mentioned stabilizers in the rubber composition.

EXAMPLE 23

A composition is prepared comprising linear polyethylene and 0.05% by weight of pentaerythritol tetrakis[3,5-di-t-butyl-4-hydroxyphenyl)propionate] and 0.01% by weight of poly[2-(ethylthio)ethyl acrylate]. The composition is injected molded into tensile bars which are placed in a circulating air oven at 120° C. In contrast to those molded from unstabilized linear polyethylene, tensile bars molded from the instant composition retain their tensile strength for substantially longer period.

EXAMPLE 24

Cyclohexene, freshly distilled is stabilized by the addition thereto of 0.05% by weight of 2,2'-methylene-bis(6-t-butyl-4-methylphenol) and 0.01% by weight of poly[di-(2-(n-butylthio)ethyl]maleate]. The effectiveness of this stabilizer in cyclohexene is tested by the ASTM D 525-55 oxidation test. The unstabilized cyclohexene fails in shorter time as compared to the stabilized cyclohexene.

EXAMPLE 25

A stabilized high temperature lubricating oil is prepared by incorporating 2% weight of 4,4'-thiobis(2-t-butyl-5-methylphenol) and 0.5% by weight of poly[di-(2-(n-hexadecylthio)ethyl citraconate] to the lubricant which comprises diisoamyl adipate. The stabilized composition is compared with the unstabilized lubricant by heating at 175° C. in the presence of air and metallic catalysts according to the test method described in Military Specification Mil-I-7808c. After 72 hours, the blank containing no stabilizer contains more sludge and has a greater viscosity than the stabilized lubricant.

EXAMPLE 26

A water-white, refined (U.S.P. grade) mineral oil (Esso PRIMOL D) is stabilized and tested under the following test conditions.

A sample of the mineral oil (10 grams) containing 0.1% by weight of di-n-octadecyl 3,5-di-t-butyl-4-hydroxybenzylphosphonate and 0.3% of poly[di-(18-(ethylthio)-n-octadecyl)fumarate] is placed in a Sligh type oxidation flask filled with oxygen at room temperature (25° C.) and atmospheric pressure. Thereafter, the flask is sealed to form a system having a mercury manometer which measures the pressure changes as oxygen is absorbed by the sample in the flask. The sample is then heated at 150° C. until the manometer registers a decrease of 300 mm Hg pressure within the flask with reference to the maximum pressure obtained at 150° C. Results of this test show the increased oxidation resistance for the sample containing the stabilizer.

EXAMPLE 27

High impact polystyrene resin containing elastomer (i.e., butadiene-styrene) is stabilized against loss of elongation properties by incorporation of 0.1% by weight of di-n-octadecyl(3-t-butyl-4-hydroxy-5-methylbenzylmalonate and 0.1% by weight of poly[2-(ethylthio)-1-methylethyl acrylate]. Under the test conditions described below, the stabilized resin retains a higher percentage of its original elongation properties, whereas the unstabilized resin retains less elongation properties. A substantial improvement in stability is also noted when only 0.05% of the stabilizer is employed.

The unstabilized resin is dissolved in chloroform and the stabilizer then added, after which the mixture is cast on a glass plate and the solvent evaporated to yield a uniform film which, upon drying, is removed and cut up, and then pressed for 7 minutes at a temperature of 163° C. and a pressure of 2,000 psi (140 Kg/cm$^2$) into a sheet of uniform thickness of 0.635 mm (25 mil). The sheets are then cut into strips approximately 10.16 cm × 1.27 cm (4 × 0.5 inches). A portion of these strips is then measured for length of elongation in the Instron Tensile (Instron Engineering Corporation, Quincy, Massachusetts). The remaining portion of the strips is aged in a forced draft oven for 6 weeks at 75° C. and thereafter tested for elongation. The stabilized polystyrene resin has retained its elongation property much better than the unstabilized resin.

Similar results are obtained when an equivalent amount of the following stabilizer combinations are used in place of the above mentioned stabilizer combinations.

(a) 0.1% by weight poly[2-(n-octylthio)ethyl methacrylate]+0.3% of 4,4'-butylidene-bis(2,6-di-t-butylphenol)

(b) 0.1% by weight poly[di(4-(n-octylthio)-butyl)maleate]+0.3% of 2,4-bis(n-octylthio)-6-(3,5-di-t-butyl-4-hydroxyanilino)-1,3,5-triazine (c) 0.1% by weight poly[2-(isopropylthis)ethyl methacrylate]+0.3% of 2,4-bis(3,5-di-t-butyl-hydroxyphenoxy-6-(n-octylthio)-1,3,5-triazine.

What is claimed is:

1. A stabilized composition which comprises
   (a) a polyolefin,
   (b) 0.005 to 5% by weight of the polyolefin (a) of a phenolic antioxidant, and
   (c) 0.005 to 5% by weight of the polyolefin (a) of a polymeric thiosynergist with the unit structural formula I

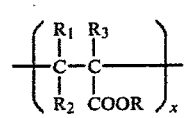

wherein
R$_1$ is hydrogen,
R$_2$ is hydrogen,
R$_3$ is methyl,
R is —CH$_2$CH$_2$—S—R$_4$
R$_4$ is alkyl of 2 to 12 carbon atoms, and
X is an integer from 25 to 90.

2. A stabilized composition according to claim 1 which comprises
   (a) a polyolefin selected from the group consisting of polypropylene, polyethylene, ethylene/propylene copolymers, chlorinated polyethylene and crosslinked polyethylene,
   (b) a phenolic antioxidant selected from the group consisting of neopentanetetrayl tetrakis[3,5-di-tert-butyl-4-hydroxyhydrocinnamate], 2,4,6-tris(3,5-di-tert-butyl-4-hydroxybenzyl)isocyanurate, 1,3,5-tris(3,5-di-tert-butyl-4-hydroxybenzyl)-2,4,6-trimethylbenzene, 1,1,3-tris(3-tert-butyl-6-methyl-4-hydroxyphenyl)butane and N,N'-bis(3,5-di-tert-butyl-4-hydroxyhydrocinnamoyl)hydrazine, and
   (c) a polymeric thiosynergist with the unit structural formula I

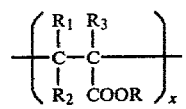

wherein
R$_1$ is hydrogen,
R$_2$ is hydrogen,
R$_3$ is methyl,
R is —CH$_2$CH$_2$—S—R$_4$,
R$_4$ is alkyl of 2 to 12 carbon atoms, and
x is an integer from 25 to 90.

3. A composition according to claim 1 wherein R$_4$ is alkyl of 2 to 8 carbon atoms.

4. A composition according to claim 1 wherein R$_4$ is ethyl.

5. A composition according to claim 1 wherein the polyolefin is selected from the group consisting of polypropylene, polyethylene, ethylene/propylene copolymers, chlorinated polyethylene and crosslinked polyethylene.

6. A composition according to claim 1 wherein the phenolic antioxidant is selected from the group consisting of neopentanetetrayl tetrakis[3,5-di-tert-butyl-4-hydroxyhydrocinnamate], 2,4,6-tris(3,5-di-tert-butyl-4-hydroxybenzyl)isocyanurate, 1,3,5-tris(3,5-di-tert-butyl-4-hydroxybenzyl)-2,4,6-trimethylbenzene, 1,1,3-tris(3-tert-butyl-6-methyl-4-hydroxyphenyl)butane and N,N'-bis(3,5-di-tert-butyl-4-hydroxyhydrocinnamoyl)hydrazine.

* * * * *